(12) United States Patent
Yin et al.

(10) Patent No.: US 9,350,963 B2
(45) Date of Patent: May 24, 2016

(54) METHOD FOR ADJUSTING COLOR VALUES OF PIXELS

(75) Inventors: Jianfeng Yin, Shanghai (CN); Jian Wang, Shanghai (CN)

(73) Assignee: VIA TECHNOLOGIES, INC., Taipei (TW)

( * ) Notice: Subject to any disclaimer, the term of this patent is extended or adjusted under 35 U.S.C. 154(b) by 1424 days.

(21) Appl. No.: 12/117,927

(22) Filed: May 9, 2008

(65) Prior Publication Data

US 2009/0109238 A1    Apr. 30, 2009

(30) Foreign Application Priority Data

Oct. 29, 2007    (CN) .......................... 2007 1 0165453

(51) Int. Cl.
*H04N 9/68* (2006.01)
*H04N 19/51* (2014.01)
*H04N 5/14* (2006.01)

(52) U.S. Cl.
CPC .................. *H04N 9/68* (2013.01); *H04N 5/144* (2013.01); *H04N 19/51* (2014.11)

(58) Field of Classification Search
None
See application file for complete search history.

(56) References Cited

U.S. PATENT DOCUMENTS

| | | | |
|---|---|---|---|
| 5,276,512 A | 1/1994 | Onda | |
| 5,428,397 A | 6/1995 | Lee et al. | |
| 5,543,939 A * | 8/1996 | Harvey et al. | ............ 375/240.02 |
| 5,757,362 A | 5/1998 | Levine | |
| 5,793,429 A | 8/1998 | Kim et al. | |
| 6,459,455 B1 * | 10/2002 | Jiang et al. | ..................... 348/452 |
| 7,542,095 B2 * | 6/2009 | Zhou et al. | ..................... 348/452 |

FOREIGN PATENT DOCUMENTS

| | | |
|---|---|---|
| CN | 1100870 A | 3/1995 |
| CN | 1668114 A | 9/2005 |
| CN | 100336395 C | 9/2007 |
| TW | 317065 | 5/1985 |
| TW | 363302 | 6/1985 |

* cited by examiner

*Primary Examiner* — Aaron M Richer

(74) *Attorney, Agent, or Firm* — Kirton McConkie; Evan R. Witt

(57) ABSTRACT

A method for adjusting color values of a video signal. The video signal includes a first frame and a second frame prior to the first frame. The method includes steps of: determining a motion-level value of a first pixel in the first frame according to color values of the first pixel and a second pixel in the second frame; performing a first filtering operation to obtain an adjusted color value of the first pixel if the motion-level value is smaller than a first threshold; performing a second filtering operation to obtain the adjusted color value of the first pixel if the motion-level value is greater than a first threshold; and performing a third filtering operation to obtain the adjusted color value of the first pixel if the motion-level value lies between the first threshold and the second threshold.

20 Claims, 3 Drawing Sheets

METHOD FOR ADJUSTING COLOR VALUES OF PIXELS

FIELD OF THE INVENTION

The present invention relates to a method for adjusting color values of pixels, and more particularly to a method for adjusting color values of pixels of a frame for filtering off noise.

BACKGROUND OF THE INVENTION

As illustrated in FIG. 1, after a video signal is inputted into a computer system (B11), the video signal is decoded (B12) and then outputted to a display (B13). During the transmission of the video signal, noise is likely mixed into the video signal. Once the ratio of the signal-to-noise (S/N) ratio is too low, the quality of the displayed image would be deteriorated.

SUMMARY OF THE INVENTION

Therefore, the present invention provides a post-processing procedure before the video signal is displayed, wherein color values of pixels of a frame to be displayed are adjusted in order to alleviate the effect of noise.

The present invention provides a method for adjusting color values of a video signal. The video signal includes a first frame and a second frame prior to the first frame. The method includes steps of: determining a motion-level value of a first pixel in the first frame according to color values of the first pixel and a second pixel in the second frame; performing a first filtering operation to obtain an adjusted color value of the first pixel if the motion-level value is smaller than a first threshold; performing a second filtering operation to obtain the adjusted color value of the first pixel if the motion-level value is greater than a second threshold; and performing a third filtering operation to obtain the adjusted color value of the first pixel if the motion-level value lies between the first threshold and the second threshold.

The present invention also provides a method for adjusting color values of a video signal, wherein the video signal includes a first frame and a second frame prior to the first frame, and the method includes steps of: determining a motion-level value of a first pixel in the first frame according to a primitive color value of the first pixel and a primitive color value of a second pixel in the second frame; comparing the motion-level value with a still-state threshold and a motion-state threshold greater than the still-state threshold; and performing a filtering operation to obtain an adjusted color value of the first pixel if the motion-level value lies between the still-state threshold and the motion-state threshold. The filtering operation includes a still-state filtering process and a motion-level filtering process performed to obtain a still-state color value and a motion-state color value, respective, and the still-state color value and a motion-state color value are further operated by the filtering operation to obtain the adjusted color value.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
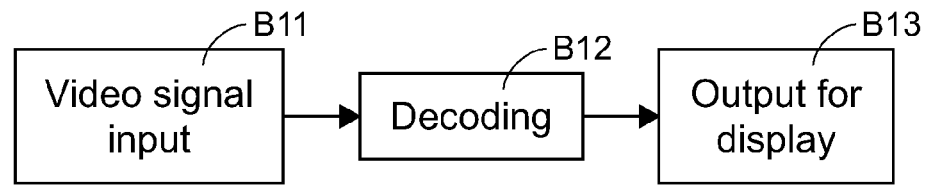
FIG. 1 is a functional block diagram illustrating a conventional image processing method.
Figure 2:
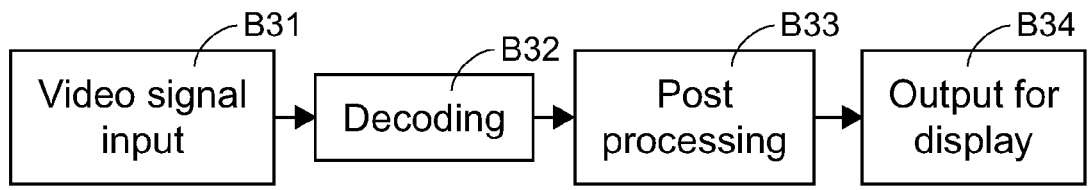
FIG. 2 is a functional block diagram illustrating a functional block diagram illustrating an image processing method including a post-processing procedure for filtering off noises.

After a video signal is inputted into a computer system (B31) and decoded (B32), the video signal is post-processed (B33) before being outputted to a display (B34), as depicted in FIG. 2. For filtering noises, the post-processing procedure B33 principally includes color-value adjustment in addition to film detection, de-interlacing, and so on.

Generally, the video signal includes a series of image frames, each of which include a plurality of pixels having different motion levels. The color values of the pixels are individually adjusted in the post-processing procedure according to respective motion levels. It is understood that noises basically have high frequencies and significantly differ from surrounding pixels, and there is little correlation between two consecutive frames at the noise positions. Therefore, for alleviating the noise effect, inter-field interpolation, which is a kind of temporal interpolation, is applied to average a color value of a pixel having a relatively low motion level with color values of pixels at corresponding positions in preceding one or more frames stored in a frame memory, thereby filtering off temporally discontinuous high-frequency noises while reserving low-frequency data. When the color value of the pixel is identical or almost identical to those of the preceding frame, inter-field interpolation will not adversely affect the image quality of the frame. On the other hand, intra-field interpolation, which is a kind of spatial interpolation, is applied to average, for example linearly average, a color value of a pixel having a relatively high motion level with color values of surrounding pixels, thereby filtering off spatially discontinuous high-frequency noises while reserving low-frequency data.

Figure 3:
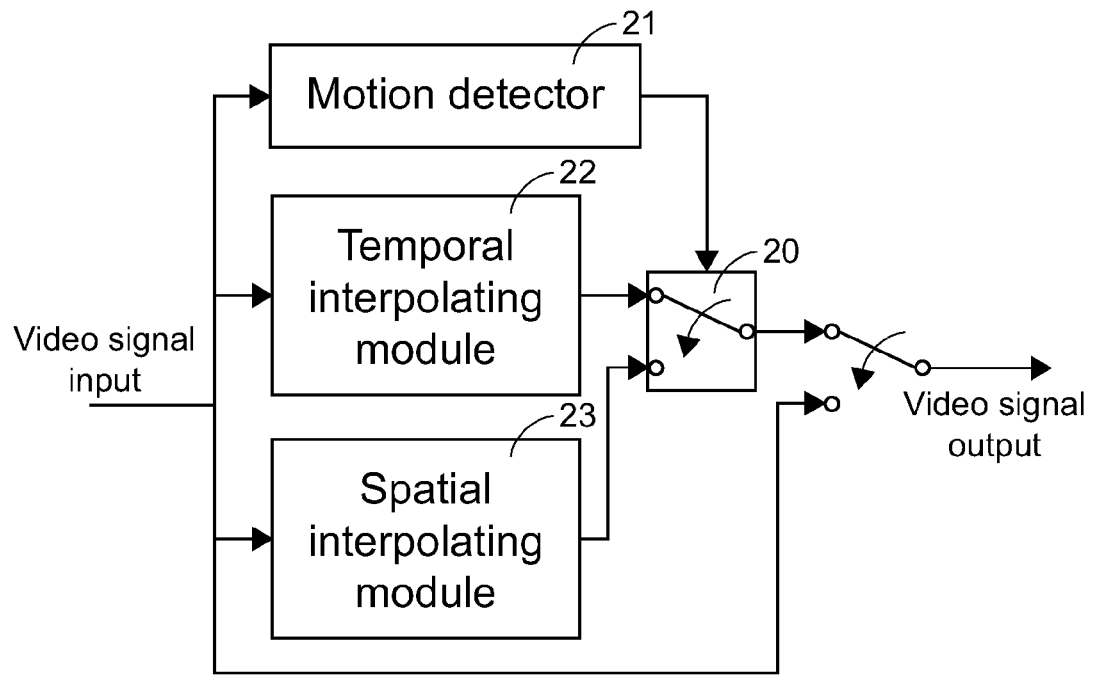
FIG. 3 is a functional block diagram illustrating an exemplified device for executing the post-processing procedure of FIG. 2.

Please refer to FIG. 3. The selection of inter-field interpolation and intra-field interpolation is illustrated. The motion levels of pixels are detected by a motion detector 21. If it is determined that the currently processed pixel has a relatively low motion level, a temporally interpolating module 22 is selected by a multiplexer 20 to perform inter-field interpolation. In contrast, if it is determined that the currently processed pixel has a relatively high motion level, intra-field interpolation is selected by the multiplexer 20 to be performed by a spatially interpolating module 23. In other words, motion-adaptive interpolation is performed to filter off noises.

Figure 4A:
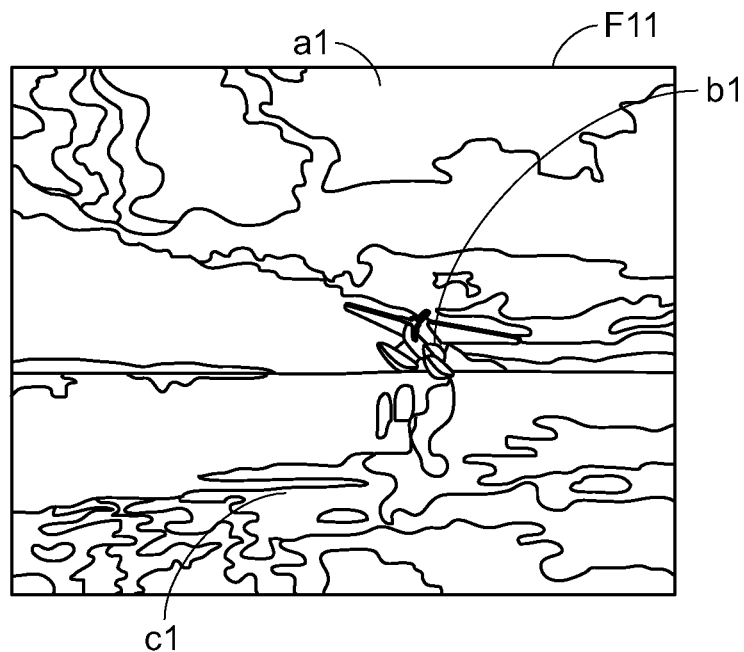
FIGS. 4A and 4B show two exemplified consecutive frames with a dramatic color-value change in a local portion.
Figure 4B:
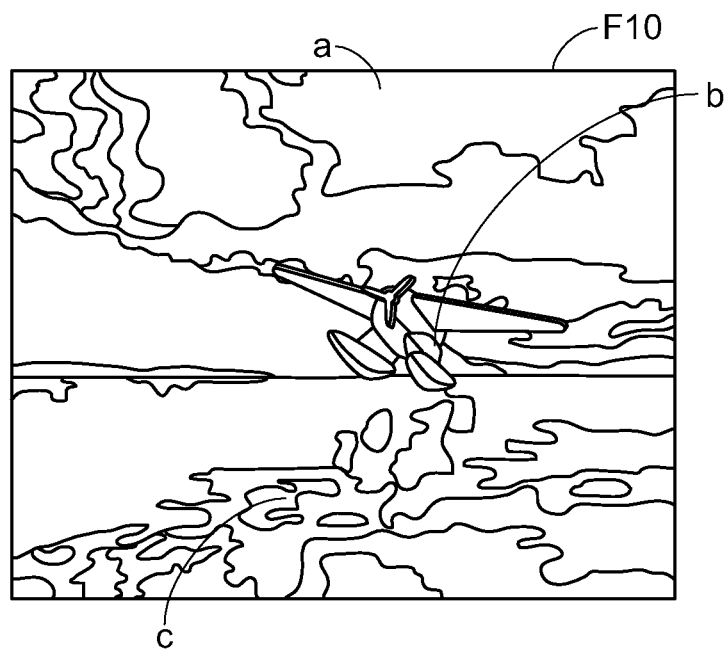

However, for image frames that include dramatically changing color values of pixels, as exemplified in FIGS. 4A and 4B, the above-described motion-adaptive interpolation is not fine enough to show the true image because high motion-level pixels are possibly blurred. The frames shown in FIG. 4A and FIG. 4B have the same pixel range or matrix size. Pixels in the two frames correspond to each other one on one. Motion detection can be performed by comparing a current pixel with the preceding pixel at a corresponding position. Most of the pixels in the current frame F10 are unchanged relative to those in the preceding frame F11 at corresponding positions, e.g. portion "a" vs. portion "a1" and portion "c" vs. portion "c1". However, a local portion "b" is apparently changing from the corresponding local portion "b1". For being capable of truthfully showing the motion from "b1" to "b" without being undesirably blurred, an improved motion-adaptive interpolation is provided according to the present invention.

Figure 5:
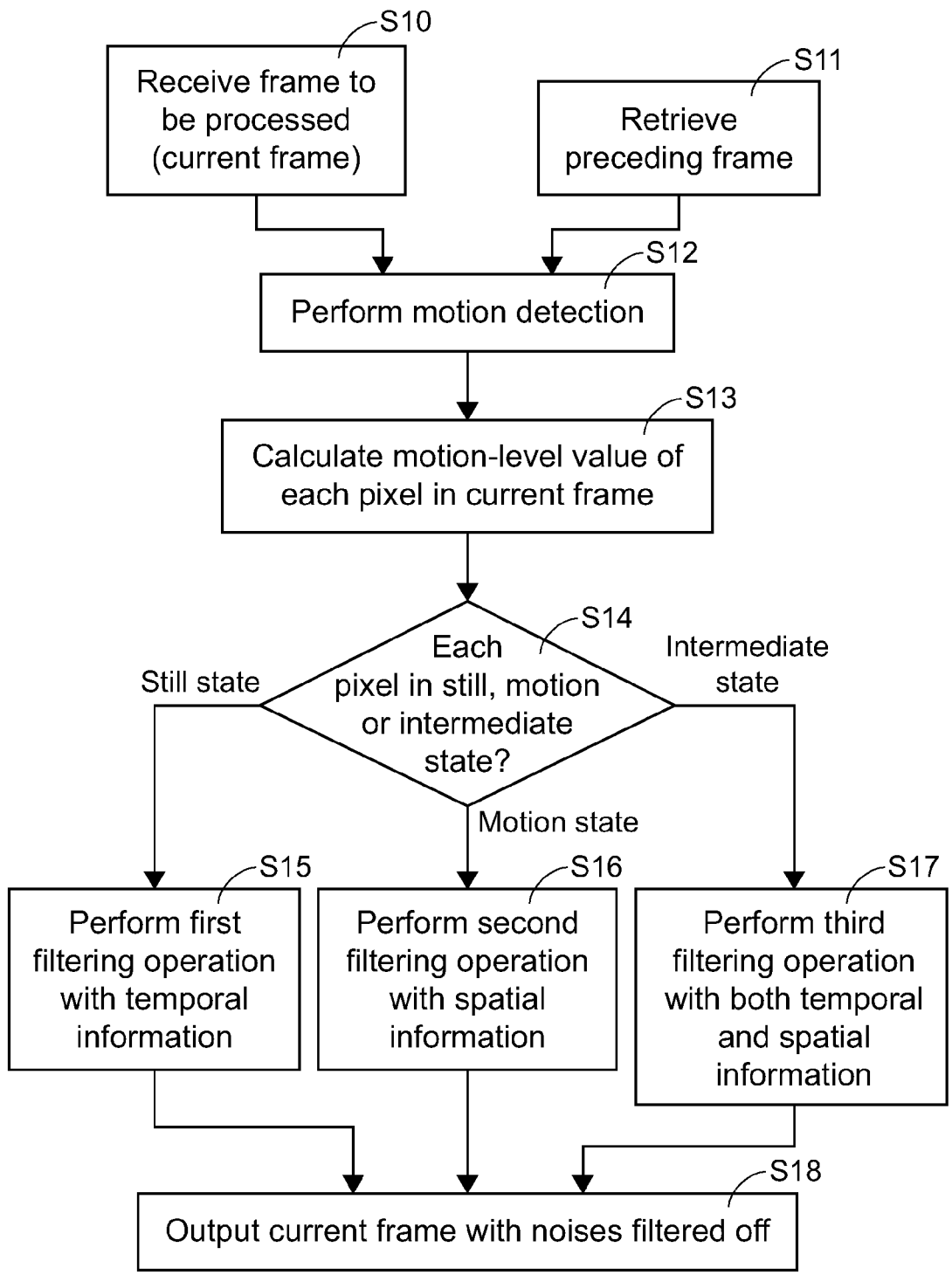
FIG. 5 is a flowchart illustrating a preferred embodiment of a method for adjusting color values of a frame according to the present invention.

A flowchart of FIG. 5 provides a method for adjusting color values of pixels adaptively according to the present invention. First of all, a current frame to be processed is received (Step S10) and the preceding frame stored in a frame memory is retrieved (Step S11). All pixels in the current frame is compared with corresponding pixels in the preceding frame (Step S12) to calculate motion-level values of pixels in the current frame (Step S13). According to the obtained motion-level value, each pixel is determined to be in a still state, a motion state or an intermediate state (Step S14). For the pixel in a still state, a first filtering operation is performed with temporal information (Step S15); for the pixel in a motion state, a second filtering operation is performed with spatial information (Step S16); and for the pixel in an intermediate state, a third operation is performed with both temporal and spatial information (Step S17). After all pixels in the current frame have been processed by respectively proper filtering operations, the current frame can be outputted with reduced noises (Step S18).

The above adjusting method will be described in more detail by taking the frames of FIGS. 4A and 4B for example. Through motion detection, respective motion-level values of all pixels in the current frame F10 are calculated. For example, a pixel A in the local portion "a" has a color value "a" and a pixel A1 in the local portion "a1" at a position corresponding to the pixel A has a color value "a1". Then, the motion-level value m of the pixel A is defined by m=|a−a1|. Not necessarily but preferably, the motion-level value m is further converted into a motion-level value m' through a saturation function as follows:

$$m' = \begin{cases} 0, & m \le \alpha \\ 255, & m > \beta \\ \frac{m-\alpha}{\beta-\alpha} *255, & \alpha < m \le \beta \end{cases}$$

where α and β are both preset thresholds, and α is smaller than β. The conversion strengthens the identification of motion levels.

According to the saturation function, if the primitive motion-level value m is less than or equal to the lower threshold α, the converted motion-level value m' is defined by a minimum motion level, e.g. 0. On the other hand, if the primitive motion-level value m is greater than the higher threshold β, the converted motion-level value m' is defined by a maximum motion level, e.g. 255 for an 8-bit color value. Furthermore, if the primitive motion-level value m lies between the two thresholds α and β, the converted motion-level value m' is equal to a linear combination value of the maximum and minimum values. In an example, the threshold α is set to a range between 5 and 10, and preferably 5, while the threshold β is set to a range between 60 and 150, and preferably 100.

After the motion-level value m' is determined, the motion-level value m' is compared to a threshold S for determining a still state of the pixel A, and a threshold M for determining a motion state of the pixel A. If the motion-level value m' is less than or equal to the lower threshold S, it is determined that the pixel A is in the still state. If the motion-level value m' is greater than the higher threshold M, it is determined that the pixel A is in the motion state. On the other hand, if the motion-level value m' lies between the two thresholds S and M, it is determined that the pixel A is in the intermediate state. In an example, the threshold S is set to a range between 10 and 40, and preferably 30, while the threshold M is set to a range between 60 and 150, and preferably 80.

In another embodiment, the motion-level value m or the converted motion-level value m' can be further processed by low-pass filtering to result in more precise motion-level value m". Principally, the motion-level value m" is obtained by introducing motion-level values of pixels around the pixel A into the motion-level value m or the converted motion-level value m' by way of weighing average. The low-pass filtering can be a matrix operator which can be 3×3, 5×5, or any other suitable order. Listed below are two 3×3-matrix examples:

$$\begin{bmatrix} 1 & 2 & 1 \\ 2 & 4 & 2 \\ 1 & 2 & 1 \end{bmatrix} \text{ or } \begin{bmatrix} 0 & 1 & 0 \\ 1 & 4 & 1 \\ 0 & 1 & 0 \end{bmatrix}.$$

Once the state of the pixel A is determined, a proper filtering operation is performed. Assuming the pixel A is in a still state, the first filtering operation is performed. In the first filtering operation, pixels of the preceding frames at a position corresponding to the pixel A and also in the still state are found, and their color values and the color value of the first found non-still-state (i.e. motion- or intermediate-state) pixel are averaged to obtain the color value of the pixel A. For example, if the pixel A1 corresponding to the pixel A is in the motion state, the processed color value a' is defined by a'=(a+a1)/2. In contrast, if the pixel A1 corresponding to the pixel A is also in the still state but another corresponding pixel A2 of a frame F12 (not shown) immediately prior to the frame F11 is not in the still state, the adjusted color value a' is defined by a'=(a+a1+a2)/3, where a2 is a color value of the pixel A2. Likewise, further color values of pixels of more preceding frames are possibly introduced to adjust the color value of the pixel A as long as continuous still pixels are found.

To be able to retrieve color values of pixels of a number of preceding frames, a frame memory with a large capacity will be required. The present invention provides an alternative way to adjust the color value of the pixel A, which need not actually store color values of all preceding pixels in frame memory.

In the alternative embodiment, a register is used for storing an accumulated number of still pixels involving in the first filtering operation, which is also referred to as a count vector. In an example that the pixel A is in the still state but the pixel A1 is in the motion state, the count is recorded as "1"; if the pixel A and the pixel A1 is in the still state but the pixel A2 is in the motion state, the count is recorded as "2"; and so on. Then the color value a' of the pixel A can be adjusted according to the primitive color value "a" of the pixel A, the color value "a1" of the preceding pixel A1 and the count vector without any further color values.

For example, in the case that the pixel A and the pixel A1 is in the still state but the pixel A2 is in the motion state, the count is recorded as "2", and the following equation applies:

$$a'=(a+a1+a2)/3 \quad (1).$$

On the other hand, since the pixel A1 is in the still state but the pixel A2 is in the motion state, the following equations apply:

$$a1'=(a1+a2)/2 \quad (2), \text{ and}$$

$$a1+a2=2*a1' \quad (3),$$

where a1' is the adjusted color value of the pixel A1. Substitute (a1+a2) of Equation (1) with Equation (3), and it is obtained:

$$a'=(a+a1+a2)/3=(a+2*a1')/(2+1) \quad (4).$$

In another example that the pixels A, A1 and A2 are in the still state but the pixel A3 immediately prior to the pixel A2 at a corresponding position is in the motion state, the count is recorded as "3", and the following equation applies:

$$a'=(a+a1+a2+a3)/4 \quad (5).$$

where a3 is the adjusted color value of the pixel A3. On the other hand, since the pixels A1 and A2 are in the still state but the pixel A3 is in the motion state, the following equations apply:

$$a1'=(a1+a2+a3)/3 \quad (6), \text{ and}$$

$$a1+a2+a3=3*a1' \quad (7).$$

Substitute (a1+a2+a3) of Equation (1) with Equation (7), and it is obtained:

$$a'=(a+a1+a2+a3)/4=(a+3*a1')/(3+1) \quad (8).$$

In view of the foregoing, it is understood that the adjusted color value a' of the pixel A can be expressed by a general formula of:

$$a'=(a+n*a1')/(n+1) \quad (9),$$

where n is the count vector recorded in the register. In other words, the adjusted color value a' of the pixel A can be obtained simply by operating the primitive color value "a" of the pixel A, the adjusted color value "a1'" of the preceding pixel A1 and the count vector "n" without recording further color values.

Accordingly, the maximum pixel number involving in the first filtering operation varies with the size of the register. For example, for an 8-bit register, color values of up to 256 still pixels and the first motion pixels can be used for calculating the adjusted color values of the current pixel.

In another example, assuming a pixel B is determined to be in a motion state, wherein the pixel B is in the local portion "b" of FIG. 4B and has a primitive color value "b", the second filtering operation is performed. Since a dramatic color-value change of a pixel in a motion state is inherent, no specific adjustment of the color value is to be made. The second filtering operation reserves the primitive color value "b" of the motion pixel B.

In a further example, assuming a pixel C is in an intermediate state, wherein the pixel C is in the local portion "c" of FIG. 4B and has a primitive color value "c", the third filtering operation is performed. In the third filtering operation, the intermediate pixel C is processed as both a still pixel and a motion pixel. For the still-feature part, i.e. the pixel C is considered as a still pixel, calculation of the adjusted color value c' is performed in a manner similar to that in the first filtering operation, i.e.

$$c'=(c+n*c1)/(n+1) \quad (10),$$

where c1 is a color value of a pixel C1 of the preceding frame F11 at a position corresponding to the pixel C, and n is an accumulated still pixel number in the register. On the other hand, for the motion-feature part, i.e. the pixel C is considered as a motion pixel, the color value c is reserved just like the second filtering operation.

Subsequently, the color value c' resulting in the still-state filtering operation and the color value c resulting in the motion-state filtering operation are combined to obtain the adjusted color value c" of the pixel C. Assume the pixel C has a motion-level value X, which can be calculated by any of previously described methods for calculating m, m' or m". Since the pixel C is in the intermediate state, the condition S≤X<M is satisfied. A motion parameter f is then obtained by the following equation:

$$f=(X-S)/(M-S) \quad (11),$$

where 0≤f≤1. Therefore, the adjusted color value c" of the pixel C can be defined by:

$$c''=c*f+c'(1-f) \quad (12).$$

In addition to the formula (11), the motion parameter f can also be defined in another way. For example, f can be defined as f=X/W, where W is the maximum motion-level value, e.g. 255. That is, f=X/255. Alternatively, f can be defined as f=source(x, y)/W, wherein source(x,y) represents luminance of the pixel.

From the above descriptions and examples, it is understand that at least three kinds of states are defined for each pixel according to a motion-level value of the pixel in a preferred embodiment according to the present invention. For each state, an adaptive filtering operation is performed. For example, for a pixel in a still state, the color value of the pixel can be adjusted according to its primitive color value, a primitive color value of a corresponding pixel of the preceding frame and an accumulated number of continuous still-state pixels. For a pixel in a motion state, the color value of the pixel is reserved from being intentionally adjusted. For a pixel in an intermediate state, it is considered as a still-state pixel to calculate the adjusted color value according to its primitive color value, a primitive color value of a corresponding pixel of the preceding frame and an accumulated number of continuous still-state pixels. Meanwhile, it is also considered as a motion-state pixel to use the primitive color value as the adjusted color value. The resulting two kind of color values are then weighing averaged according to a preset and modifiable threshold S for determining a still state of a pixel, a preset and modifiable threshold M for determining a motion state of a pixel, and a calculated motion-level value of the pixel, or properly combined in alternative ways. In this way, each pixel in a frame can be adaptively adjusted to filter off noises.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for adjusting color values of pixels within a video frame to alleviate the effect of noise that was introduced into the pixels during transmission of the video frame for display, the method comprising:

maintaining a count vector which defines, for each pixel within a current frame, a count (n) of the number of consecutive frames up to and including the current frame having a corresponding pixel with a motion-level value less than a first threshold;

storing, for each pixel within a previous frame that immediately preceded the current frame, a color value (a1) that was assigned to the pixel;

comparing a color value (a) of each pixel of the current frame to the color value (a1) that was assigned to the corresponding pixel of the previous frame to calculate a motion-level value (m) for each pixel in the current frame, the motion-level value (m) comprising the difference between the color value (a) of the pixel in the current frame and the color value (a1) of the corresponding pixel in the previous frame;

for each pixel in the current frame, identifying a filtering operation to apply to the pixel based on the motion-level value (m) calculated for the pixel to thereby generate an adjusted color value (a') for the pixel, wherein:

when the motion-level value (m) of the pixel is below a first threshold (S), a first filtering operation is employed to generate the adjusted color value (a') for the pixel, the first filtering operation employing the following formula:

$$a' = \frac{(a + n * a1)}{(n + 1)}$$

when the motion-level value (m) of the pixel is between the first threshold (S) and a second threshold (M), a second filtering operation is employed to generate the adjusted color value (a') for the pixel, the second filtering operation employing the following formula:

$a' = a$; and when the motion-level value (m) of the pixel is above the second threshold (M), a third filtering operation is employed to generate the adjusted color value (a') for the pixel, the third filtering operation employing the following formula:

$$a' = a * f + \frac{(a + n * a1)}{(n + 1)} * (1 - f)$$

where f is a motion parameter based on the motion-level value (m); and outputting the current frame for display with each pixel in the current frame being assigned the adjusted color value (a') that was generated for the pixel.

2. The method of claim 1, wherein the motion parameter f is generated using the following formula:

$$f = \frac{m - S}{M - S}$$

3. The method of claim 1, wherein the motion parameter f is generated using the following formula:

$$f = \frac{m}{W}$$

where W is a maximum value of the motion-level value (m).

4. The method of claim 1, wherein the motion parameter f is generated using the following formula:

$$f = \frac{\text{source}(x, y)}{W}$$

where source(x,y) represents luminance of the pixel and W is a maximum value of the motion-level value (m).

5. The method of claim 1, further comprising:
updating the count vector and the stored color values based on the processing of the current frame.

6. The method of claim 5, further comprising:
processing a subsequent frame using the updated count vector and the updated stored color values.

7. The method of claim 1, wherein the motion-level value (m) comprises a motion-level value (m') converted through a saturation function.

8. The method of claim 7, wherein the saturation function comprises:

$$m' = \begin{cases} 0, & m \leq \alpha \\ w, & m > \beta \\ \frac{m - \alpha}{\beta - \alpha} * w, & \alpha < m \leq \beta \end{cases}$$

where W is a maximum value of the motion-level value (m); and α and β are both preset thresholds and α is smaller than β.

9. The method of claim 7, further comprising:
applying a low-pass filter to the converted motion-level value (m').

10. The method of claim 7, further comprising:
applying a low-pass filter to the motion-level value (m).

11. A system for processing video comprising:
one or more processors; and
one or more computer storage media storing computer executable instructions which when executed by the one or more processors implement a method for adjusting color values of pixels within a video frame to alleviate the effect of noise that was introduced into the pixels during transmission of the video frame for display, the method comprising:

maintaining a count vector which defines, for each pixel within a current frame, a count (n) of the number of consecutive frames up to and including the current frame having a corresponding pixel with a motion-level value less than a first threshold;

storing, for each pixel within a previous frame that immediately preceded the current frame, a color value (a1) that was assigned to the pixel;

comparing a color value (a) of each pixel of the current frame to the color value (a1) that was assigned to the corresponding pixel of the previous frame to calculate a motion-level value (m) for each pixel in the current frame, the motion-level value (m) comprising the difference between the color value (a) of the pixel in the current frame and the color value (a1) of the corresponding pixel in the previous frame;

for each pixel in the current frame, identifying a filtering operation to apply to the pixel based on the motion-level value (m) calculated for the pixel to thereby generate an adjusted color value (a') for the pixel, wherein:

when the motion-level value (m) of the pixel is below a first threshold (S), a first filtering operation is employed to generate the adjusted color value (a') for the pixel, the first filtering operation employing the following formula:

$$a' = \frac{(a + n * a1)}{(n + 1)}$$

when the motion-level value (m) of the pixel is between the first threshold (S) and a second threshold (M), a second filtering operation is employed to generate the adjusted color value (a') for the pixel, the second filtering operation employing the following formula:

$a' = a$; and when the motion-level value (m) of the pixel is above the second threshold (M), a third filtering operation is employed to generate the adjusted color value (a') for the pixel, the third filtering operation employing the following formula:

$$a' = a * f + \frac{(a + n * a1)}{(n + 1)} * (1 - f)$$

where f is a motion parameter based on the motion-level value (m); and outputting the current frame for display with each pixel in the current frame being assigned the adjusted color value (a') that was generated for the pixel.

12. The system of claim 11, wherein the motion parameter f is generated using the following formula:

$$f = \frac{m - S}{M - S}$$

13. The system of claim 11, wherein the motion parameter f is generated using the following formula:

$$f = \frac{m}{W}$$

where W is a maximum value of the motion-level value (m).

14. The system of claim 11, wherein the motion parameter f is generated using the following formula:

$$f = \frac{\text{source}(x, y)}{W}$$

where source(x,y) represents luminance of the pixel and W is a maximum value of the motion-level value (m).

15. The system of claim 11, wherein the method further comprises:

updating the count vector and the stored color values based on the processing of the current frame.

16. The system of claim 15, wherein the method further comprises:

processing a subsequent frame using the updated count vector and the updated stored color values.

17. The system of claim 11, wherein the motion-level value (m) comprises a motion-level value (m') converted through a saturation function.

18. The system of claim 17, wherein the saturation function comprises:

$$m' = \begin{cases} 0, & m \le \alpha \\ w, & m > \beta \\ \frac{m - \alpha}{\beta - \alpha} * w, & \alpha < m \le \beta \end{cases}$$

where W is a maximum value of the motion-level value (m); and $\alpha$ and $\beta$ are both preset thresholds and $\alpha$ is smaller than $\beta$.

19. The system of claim 17, wherein the method further comprises:

applying a low-pass filter to the converted motion-level value (m').

20. The system of claim 11, wherein the method further comprises:

applying a low-pass filter to the motion-level value (m).

\* \* \* \* \*